June 24, 1969 H. A. KHOURY 3,451,311

INCREMENTAL MOTION ACTUATOR

Filed Sept. 7, 1967 Sheet 1 of 3

INVENTOR
HENRI A. KHOURY

BY Roger S. Smith

ATTORNEY

United States Patent Office 3,451,311
Patented June 24, 1969

3,451,311
INCREMENTAL MOTION ACTUATOR

Henri A. Khoury, Yorktown Heights, N.Y., assignor to International Business Machines Corporation, Armonk, N.Y., a corporation of New York Filed Sept. 7, 1967, Ser. No. 666,212
Int. Cl. F15b *11/18*; F16j *3/00*
U.S. Cl. 91—36 11 Claims

ABSTRACT OF THE DISCLOSURE

An actuator including a plurality of actuating cells arranged in a file and connected in cascade to impart incremental movements to a load. Each cell has a flexible tape slidably received therein and anchored to the cell at one end. Pressure means are provided to deflect a portion of the tape transversely into a cavity in the cell to draw the tape inwardly. The free end of the tape of each cell is connected to the preceding cell and the free end of the tape in the leading cell is connected to the load. All cells except the last cell in the file are slidable in the direction of movement of the load; the last cell is secured to a reference surface. Stop means limit the movement effected by each cell to a predetermined number of increments in accordance with a selected code. Complementary files of cells at opposite sides of the load provide positive control in both directions of movement.

*Summary of invention*

The present invention relates to actuators for producing selective incremental movements of a load member in response to input commands, and more particularly to an improved incremental positioning device that makes use of fluid elements having force-displacement characteristics uniquely adapted to actuate high-mass loads.

In many areas of current industrial technology there is a need for apparatus which can accurately position load elements at any of a number of incremental points. Such a need exists, for example, in article sorting apparatus where articles travelling along a common path must be diverted to selected ones of a number of output paths. Generally similar applications in automated or semiautomated equipment are numerous. Many devices for performing incremental movements are known in the art, including devices which employ fluid actuation of one form or another. Fluid actuated devices, however, usually take the form of piston and cylinder combinations, and require substantial apparatus. In addition, such devices have force displacement characteristics which do not make maximum force available at zero displacement, as is desirable in actuating massive loads from a standstill.

It is the object of the present invention to provide a fluid actuated incremental motion producing device which is extremely simple in construction and which has force-displacement characteristics that make maximum forces available during initial movement of the load means.

It is also an object of the invention to provide a unique incremental motion device that is responsive to coded input signals, whereby to simplify the control apparatus involved and reduce the number of actuating elements.

This invention makes use of a fluid logic or actuator cell which comprises a strip or tape of flexible material received in an elongated slot in a housing member. One end of the tape is fixedly secured with respect to the housing and the other end is free to move in the elongated slot. A cavity is formed in the housing in communication with the slot and with a portion of the tape in the slot. An actuating port is provided in the housing to communicate with the slot at a point on the opposite side of the tape from the cavity. To operate this cell, pressure is supplied via the port to deflect a portion of the tape into the cavity. This deflection draws the free end of the tape inwardly through the slot.

The activating cell just described is disclosed in U.S. Patent 3,312,238, assigned to the assignee hereof. As described in that patent, the cell offers significant advantages as an actuator in that it has a force displacement characteristic that matches very closely the requirements for actuating high mass loads. The force exerted to draw the tape into the housing is greatest during the initial movement of the tape, and this force decreases smoothly as the displacement of the tape increases. Thus, high breakaway force is present to establish initial movement of the load, and good control over the load during movement is achieved by a reduction in force as displacement increases.

Various applications of the actuator cell are taught in the patent referred to above, and in the U.S. Patents 3,263,922 and 3,312,244, identified as co-pending applications in the referred-to patent. According to the present invention, the cell is incorporated in yet a different novel combination to provide an efficient incremental movement actuator that can respond to coded or uncoded input signals to provide controlled movements. Moreover, the actuating signals may be applied serially or in parallel without interfering with the operation of the device.

Briefly explained, the present invention employs a plurality of actuators arranged in a file and connected together so that the free end of the tape in each actuator, except the first in the file, is connected to the preceding actuator. The leading actuator has its tape connected to the load member. Each actuator except the last actuator in the file, is supported for free movement in the direction of desired movement of the load; the last actuator is anchored to the reference means with respect to which the load moves. Incremental movements of the load are achieved by selectively operating the actuators to deflect the tapes therein. Each actuator in the file sees the preceding actuators as part of the load to be moved, and sees the succeeding actuators as part of the reference means with respect to which movement is desired. The incremental movement performed by each actuator is controlled by stop means which limit the allowable deflection of its tape. Various coding arrangements may be incorporated by weighting the actuators and adjusting the "stroke" of each.

The foregoing and other objects, features and advantages of the invention will be apparent from the following more particular description of preferred embodiments of the invention, as illustrated in the accompanying drawings.

*Detailed description*

Figure 1:
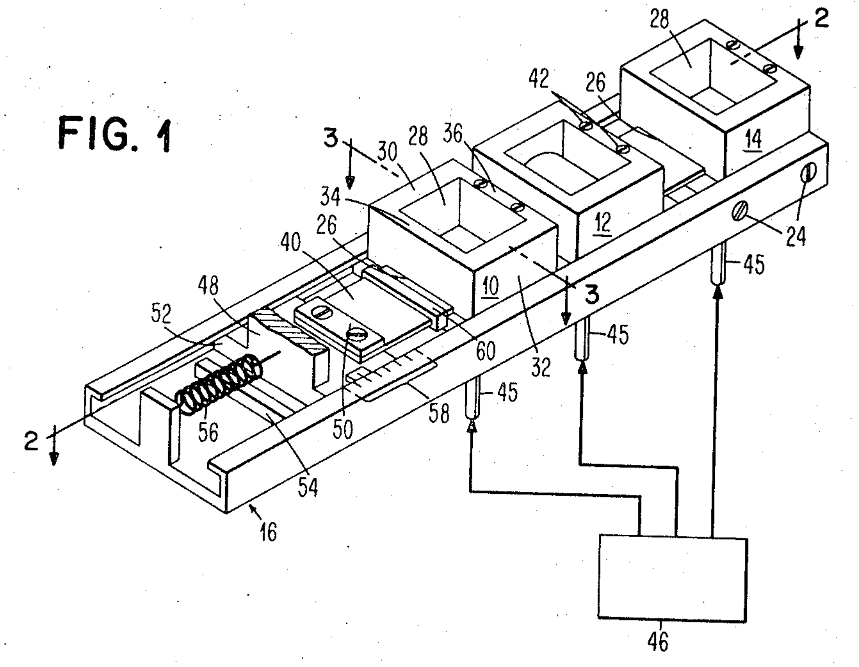
FIGURE 1 is a perspective illustration of a simple incremental movement actuator provided in accordance with this invention.
Figure 3:
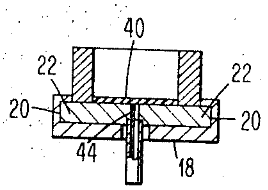
FIGURE 3 is a sectional view taken generally along the line 3—3 of FIGURE 1.

Referring now in detail to the drawings, there is shown in FIGURE 1 a simple incremental actuator embodying this invention. The actuator comprises a plurality of similar actuator cells 10, 12 and 14 arranged in a file. The cells 10 and 12 are supported for rectilinear movement on a supporting member 16. As illustrated in FIGURE 3, the member 16 includes a flat slide-plate 18 with guide slots 20 formed at its opposite sides. Each of the cells 10–14 has transversely extending guide protrusions 22 formed thereon which are slidably received in the slots 20 to restrain the cells against movement other than along the slide-plate 18. The final cell 14 in the file is secured in fixed relation to the support 16 by suitable means such as the bolts or pins shown at 24 in FIGURE 1.

Figure 2:
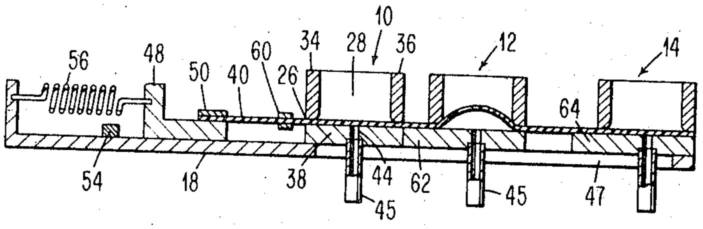
FIGURE 2 is a sectional view taken along the line 2—2 of FIGURE 1, showing the general construction of an actuator cell.

Each cell 10–14 comprises a housing which has a longitudinal slot 26 formed therein intermediate its top and bottom edges. The slot 26 communicates with a cavity indicated at 28 near the center of the housing. The cavity 28 may open to the exterior of the housing at the top as shown in FIGURE 2. It is the same width as the slot 26 and is bounded at the sides by parallel vertical walls 30, 32, 34 and 36, and at the bottom by the slot 26. The front and rear walls 34 and 36 are rounded smoothly to join the upper surface of the slot 26 as shown. While the cell may be constructed in various ways, a convenient construction may consist of a bottom plate 38 to which is bolted or otherwise secured an open rectangular member including the four walls 30–36. The slot 28 may be formed by milling a channel in the lower surface of the front and rear walls 34 and 36 of the rectangular member.

The operating tape member 40 of the cell consists of an elongated flexible strip of material of a width and thickness sufficient to substantially fill the slot 26 while maintaining clearance to move with respect thereto. The tape 40 may be formed of a flexible polyester such as "Mylar" or it may be of a metallic material such as stainless steel, for example. It must have sufficient flexibility to permit deflection of a portion thereof into the cavity 28. The tape 40 extends the full length of the slot 26 and beyond the front side of the cell. It is anchored to the housing at the rear of cavity 28 by means such as the bolts 42.

Beneath the tape 40 and adjacent the cavity 28, there is provided an actuating port 44 in the lower plate 38 of the housing. This port communicates with the slot 26 and has a fluid supply conduit 45 connected thereto through which pressurized fluid may be admitted to the cell from a valved source generally indicated by the rectangle 46 in FIGURE 1. The conduits 45 are flexible to permit free movement of the several actuators. A slot 47 is guideplate 18 permits movement of the conduits 45 with their respective actuators.

The cells 10–14 are interconnected in an operative chain by attaching the free portion of the tape 40 that extends from each cell to the next preceding cell in the file. This is accomplished in the embodiment of FIGURE 1 by providing a single tape 40 which extends through all cells; it could also be accomplished by clamping the free end of the tape section in each cell to the rear wall of the preceding cell. The free end of the tape 40 extending from the first cell 10 in the file is clamped securely to the load member 48 that is to be moved relative to the supporting means 16. A clamp bar 50 is provided for this purpose.

The load means 48 (which may take many forms, depending upon the particular application of this invention) is, like the actuator cells, mounted for translation along the slide-plate 18, and has guide protrusions 52 engaged with the guide slots 20. In the simplified embodiment of FIGURE 1, it is continuously urged toward its leftmost position against a reference stop 54 by a spring 56 connected between the load member 48 and a fixed support. The load is incrementally translated toward the file of actuators by application of coded input fluid signals to the actuator ports 44.

As indicated by the scale 58 on the support 16, the load is movable to any of seven selected positions. These seven positions are established by assigning incremental movement distances to each actuator in accordance with a binary code. The actuator 10 is assigned a distance value of one increment, the actuator 12 a value of two increments, and the actuator 14 a distance value of four increments. Stop means are provided to limit the movement resulting from operation of each actuator to the assigned distance. In the case of actuator 10, the stop means consists of a block 60 fixed to the tape 40 between the device 10 and the load 48. The block 60 is spaced on the tape one unit of distance away from the front wall 34 of the cell 10 and will permit the tape to be drawn into the actuator a distrance equal to one unit. The stop means for cell 12 consists of an extension 62 of its bottom plate 38 which terminates two units of distance from the rear wall of cell 10. The stop means for cell 14 consists of a similar extension 64 on its bottom plate which terminates four units of distance from cell 12.

Any selected increment of movement of the load 48 may be achieved by actuating the proper combination of actuators 10, 12, and 14. If, for example, two units of movement are to be made, then cell 12 is activated by applying pressurized fluid to its port 44. This creates a pressure gradient in the cavity 28 of that cell and forces the tape 40 to deflect upwardly under the influence of the fluid, as shown in FIGURE 2, and to draw the tape inwardly through the slot 26 until the stop 62 engages the rear wall of cell 10. For so long as the position is to be maintained, the fluid pressure is provided to hold the load against the action of the spring 56. Some loss of fluid will be experienced during the holding time by virtue of the leakage around the side edges of the tape and beneath the tape in the slot 26. This leakage may be kept small by proper dimensioning of the parts and, if the operating fluid is in gaseous form, such as air, the leakage is not objectionable.

Movements to the other six possible positions are achieved by activating the cells in combinations in accordance with the binary values assigned them; one unit being achieved by operating cell 10 alone; three units by operating both cells 10 and 12, and so on. By virtue of the unique combination of the cells, they may be actuated in parallel rather than serially so that smooth high speed indexing of the load is realized.

Figure 4:
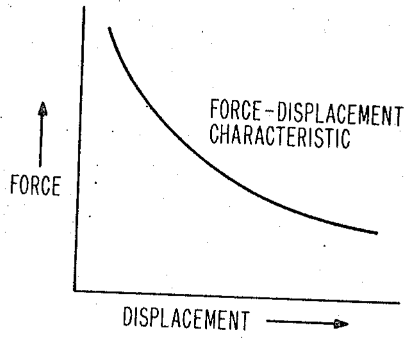
FIGURE 4 is a graph illustrating the force-displacement characteristics of the actuator cell employed in this invention.

As mentioned earlier herein, the actuator cells employed in this invention have force-displacement characteristics which make them extremely well adapted for moving massive loads. FIGURE 4 depicts this characteristc. As may be seen, the force exerted on the load is greatest during the initial movement of the tape within the cell, and decreases smoothly as displacement increases. High breakaway force is, accordingly, available with assurance of good control during movement and a gentle stop when the full extent of movement has been realized. The arrangement of cells in accordance with this invention takes full advantage of this force-displacement characteristic by effecting a simultaneous or parallel operation of the several cells taking part in a given movement. All cells apply their maximum force at the same time, and all reduce the driving force in an orderly fashion. At the end of the movement, only the cell with the longest "stroke" is in operation so only its then reduced force is effective when the final stop is engaged.

In many applications, it is not practicable to employ positive control of a load member from one side only, as in FIGURE 1. In such cases, positive control in both movement directions, and positive control of the load while at rest may be obtained by the embodiment of the invention shown in FIGURE 5 of the drawings. This embodiment is arranged to move a load member 70, which may be a guide assembly in a document handling device, for example, to any of sixteen discrete positions along a guideway 72 to which the assembly 70 is slidably mounted. A position indicating scale for the sixteen positions is shown at 74 on the support 76 for the guideway. The actuating mechanism includes two parallel, spaced-apart slide plates 78 and 80, mounted on the support 76 and extending at right angles to the guideway 72. Each of the plates 78 and 80 supports four actuator cells. The cells are similar in construction to cells 10–14 of FIGURE 1 and are identified in FIGURE 5 by binary values that they represent, the cells on plate 78 representing values $\bar{2}^0$, $\bar{2}^1$, $\bar{2}^2$ and $\bar{2}^3$ and the cells on plate 80 representing values $2^0$, $2^1$, $2^2$ and $2^3$. The upper three cells on each plate are mounted for sliding movement in the manner shown in FIGURE 1, while the lower cells $\bar{2}^3$ and $2^3$ are fixed to the plates 78 and 80.

A flexible tape 82 (similar to tape 40 of FIGURE 1) extends through all of the cells on plate 78, over an idler pulley 84 at the intersection of plate 78 and support 76, along the support adjacent the guideway 72, over a second idler pulley 86 at the intersection of support 76 and plate 80, and, finally, through all of the cells on plate 80. The tape is secured to the rear (lower) wall of each actuator cell in the manner described in FIGURE 1, and it is clamped securely to a lug 88 which depends from the load assembly 70.

As indicated by their reference characters, the actuator cells $\bar{2}^0$–$\bar{2}^3$ and $2^0$–$2^3$ are distance weighted in binary code. Each has a stop member 90 at its forward (upper) end. The cells are spaced along the tape 82 so that the last cells $\bar{2}^3$ and $2^3$ in the two files are arranged eight units away from their preceding cells, the cells $\bar{2}^2$ and $2^2$ are arranged four units from the preceding cells, and the cells $\bar{2}^1$ and $2^1$ are arranged two units away from the leading cells in the files. Stop members 92 are fixed on the tape 82 one unit of distance in front of the leading cells $\bar{2}^0$ and $2^0$. Thus, in each of the two files, sixteen increments of movement are available. The length of the tape 82 is such that when all of the cells on guide 78 are actuated and, accordingly, in the fully retracted position with all stops engaged, the cells on guide 80 must all be unactuated and in fully extended position. This represents the leftmost or zero position of the load 70. The extreme rightmost position of the load 70 is attained by actuating all cells on guide 80 and deactivating the cells on guide 78.

Figure 5:
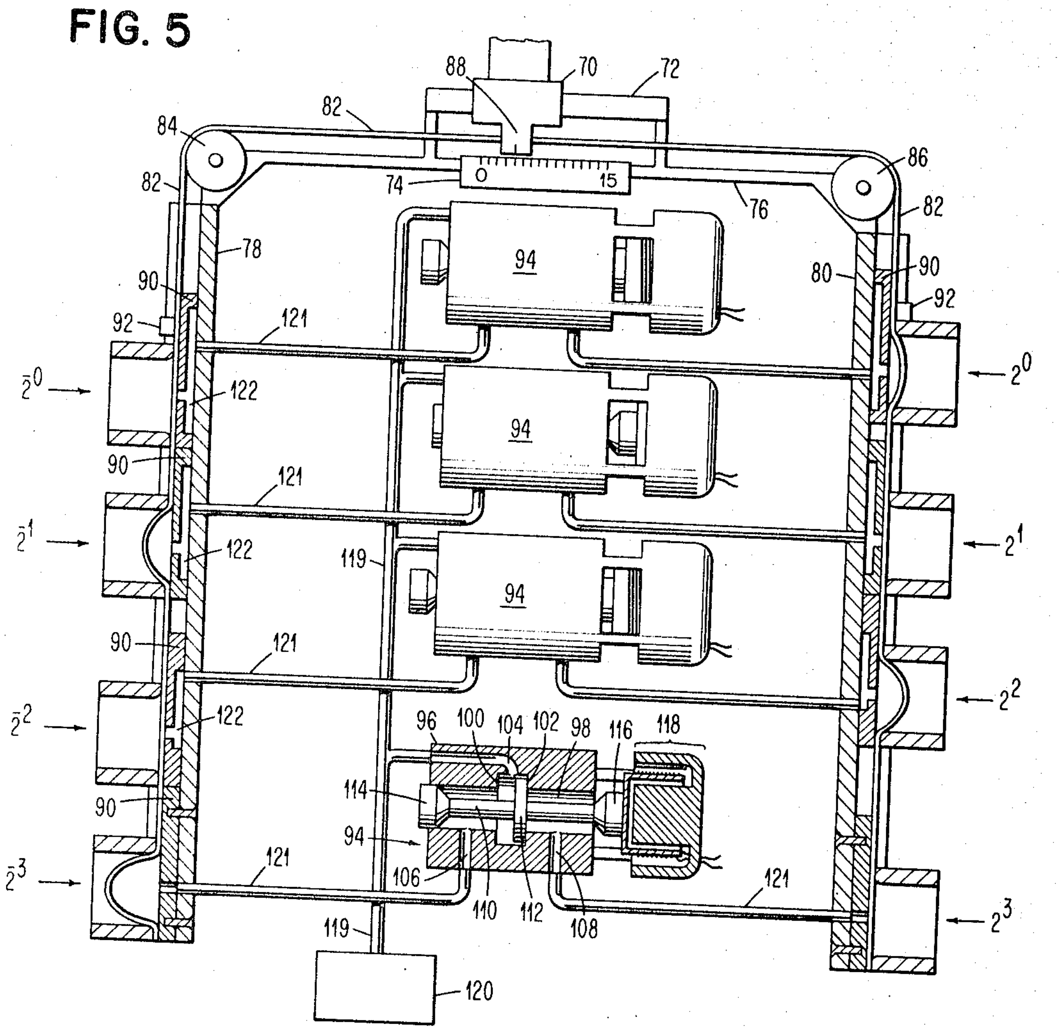
FIGURE 5 is a sectional view illustrating an embodiment of the invention which is capable of positively controlling a load at any of 16 discrete positions.

The corresponding cells on each of the two guides are operable in the alternative to achieve any desired load position intermediate the two extremes. To this end, each pair of corresponding cells is controlled by a binary valve 94 that supplies pressurized operating fluid to one cell of the pair while venting the other to atmosphere. One of valves 94 in FIGURE 5 is shown in section. It consists of a housing 96 having a central bore 98 extending therethrough. At the center of the housing, the bore is enlarged to provide a cavity having a valve seating shoulders 100 and 102 at each side. A pressure inlet port 104 communicates with this enlarged cavity and two outlet ports 106 and 108 connect with the bore 98 at opposite sides of the cavity.

A valve stem 110 is loosely received in the bore 98 for axial movement. The stem has a valve 112 mounted thereon within the enlarged cavity and adapted to engage the seats 100 and 102 as the stem is moved. The stem also has valve portions 114 and 116 at its opposite ends. These portions are arranged to open or close the opposite ends of the bore to atmosphere. They are spaced so that when the valve 112 is seated against the left shoulder 100 of the valve body, the valve portion 114 admits atmospheric air to the left end of the bore, venting outlet port 106 to atmosphere, while the valve portion 116 seals the right end of the bore. In this position, the inlet port 104 is in communication with outlet port 108. Conversely, when the valve 112 is seated against the right shoulder 102, to connect inlet 104 with outlet 106, valve portion 114 seals the left end of bore 98 and valve portion 116 opens the right end, venting outlet port 108 to atmosphere. Pressure is thus supplied from the inlet to one of the two outlets in each case while the other outlet is opened to the atmosphere. Movement of the stem from one position to the other is effected by an electromagnetic actuator generally indicated at 118. A suitable actuator for this purpose is the device generally known in the art as a "voice coil actuator."

The inlet port 104 of each valve is connected via conduit 119 to a source of fluid pressure 120. The two outlet ports 106 and 108 of each valve 94 are connected via conduits 121 respectively to the actuating ports 122 of the pair of cells controlled by that valve. FIGURE 5 shows a somewhat modified arrangement of the ports 122 which permits the use of stationary conduits 121, rather than the flexible conduits 45 shown in FIGURE 1. As illustrated in FIGURE 5, each conduit is extended through the guide 78 or 80 in a position which is beneath the cell serviced by that conduit at all positions it may occupy. The actuating port 122 in the cell is flared at the bottom to form an elongated opening that communicates with the conduit irrespective of the position of the cell. This arrangement not only avoids the necessity for flexing the conduits, but additionally provides fluid lubrication for the cell when it is caused to move by application of pressure thereto. This fluid lubrication counteracts the normal force exerted by the cell under influence of pressure beneath the tape 82 and reduces frictional forces tending to restrict movement of the cell.

As will be seen from FIGURE 5, movement of the load 70 to any desired incremental position may be achieved by selectively supplying signals to the several valves 94. Since the several cells are assigned binary coded movement increments, a straight binary code is used to select the position desired. For example, position 5 is achieved by actuating cells $\bar{2}^3$, $2^2$, $\bar{2}^1$, $2^0$ representing binary value 0101). The valves serving cell pairs $\bar{2}^3$, $2^3$ and $\bar{2}^1$, $2^1$ are actuated to pressurize the left or zero-value cells of those pairs and vent the right cells to atmosphere. The valves serving cell pairs $\bar{2}^2$, $2^2$ and $\bar{2}^0$, $2^0$ are actuated to pressurize the right hand or one-value cells of the pairs. Other positions are achieved in like manner.

This actuating system has all of the advantages of the embodiment of FIGURE 1 and, in addition, enjoys the advantage that the load is postiively controlled in both directions of movement. Its at-rest positions may also be controlled if fluid pressure is constantly available from source 120. If this is not desirable, a detenting arrangement may be employed. The system of FIGURE 5 also ensures equal forces on the load in both directions, so that access time in both directions can be controlled. The actuating mechanism does not work against any return force such as the spring 56, so higher accelerations are realized. In addition, settling times after the stops are engaged are reduced.

Figures 6, 7:
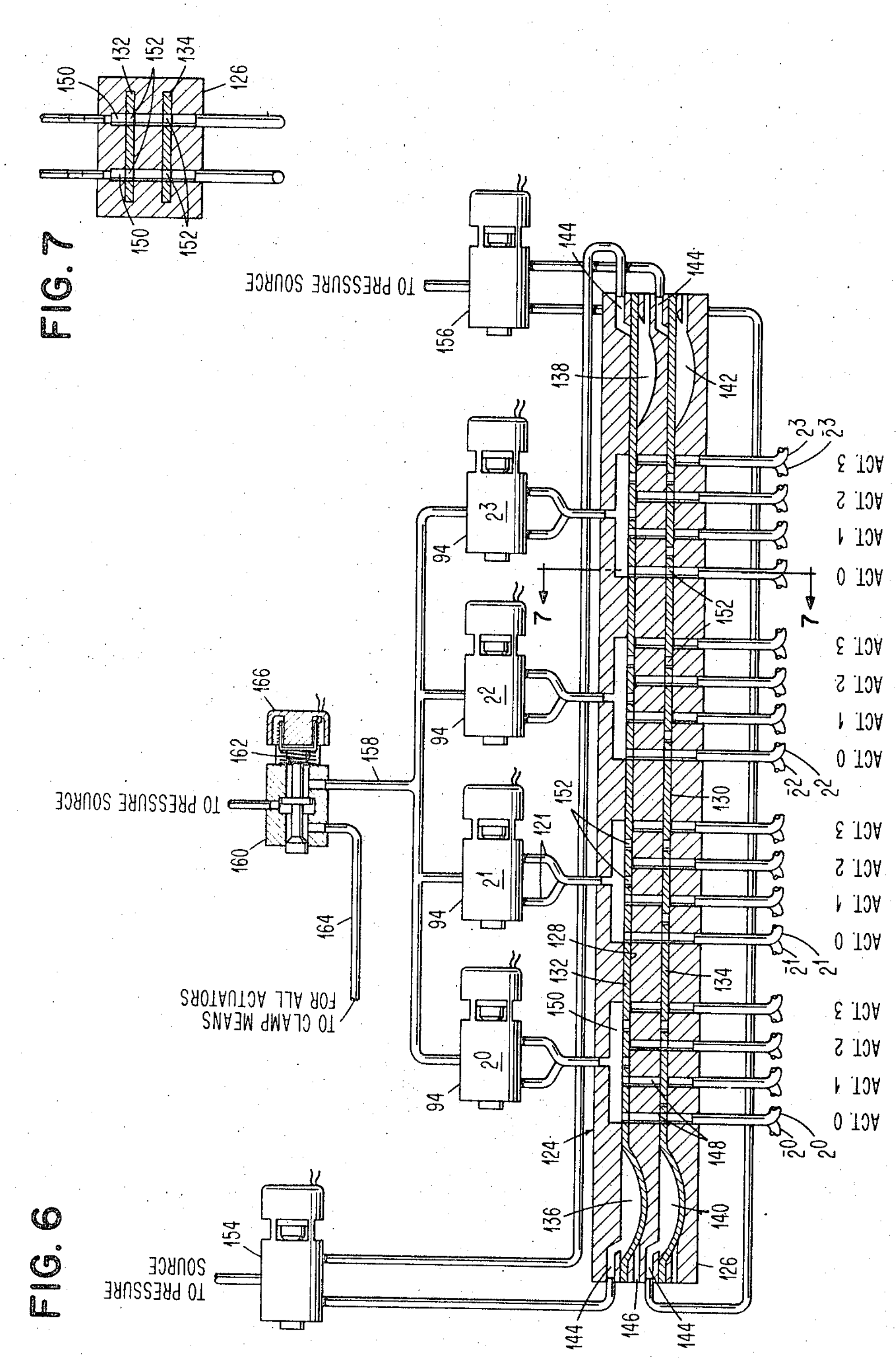
FIGURE 6 is a schematic illustration of an arrangement for operating a plurality of actuators of the type shown in FIGURE 5 with a common valve group.
FIGURE 7 is a sectional view taken substantially along the line 7—7 of FIGURE 6.

FIGURES 6 and 7 illustrate an arrangement for controlling a plurality of actuators of the type shown in FIGURE 5 with a common control valve group. In this embodiment a distribution device 124 employing flexible tapes is used to selectively connect a common group of four binary control valves 94 to any one of four actuators (not shown). Each of the four actuators is similar to the one shown in FIGURE 5 and has four pairs of complementary cells $\bar{2}^0$, $2^0$ through $\bar{2}^3$, $2^3$.

The distributor 124 of this control arrangement is of the general type described in U.S. Patent 3,312,238, mentioned earlier herein, and comprises a housing 126 having two vertically spaced slots 128 and 130 therein, adapted to slidably receive tape sections 132 and 134. Cavities 136 and 138 are provided at the opposite ends of slot 128 and cavities 140 and 142 are provided at the opposite ends of slot 130. Adjacent each cavity is an actuating port 144 in the housing 126. These ports communicate with the slots on the opposite side of the tapes from the cavities so that when pressure is applied through them, the sections of tape adjacent the cavities will be deflected into the cavities. As will be seen in FIGURE 6, an exhaust port 146 is provided near the bottom of each cavity to prevent a build-up of pressure beneath the tape as it moves into the cavity. The two tape sections 132 and 134 are fixed to the housing just beyond the cavities. The free length of tape between the fixed ends is long enough to curve into one of the two cavities associated with it, but not both. Thus, by alternately pressurizing the ports at the opposite ends of the tape section, it may be made to deflect first into one cavity and then the other, sliding its intermediate portion back and forth in the slot.

The housing 126 of the distributor between the cavities contains four groups of passages 148 extending vertically therethrough. These groups of passages are adapted to connect the output conduits 121 of the valves 94 to the appropriate cells of the four actuators served by the control system of FIGURE 6. There are eight passages in each group arranged in two sub-groups of four each. Only one sub-group of each group can be seen in FIGURE 6; the other sub-groups are aligned behind the ones shown in a direction normal to the plane of the paper, as can be seen in FIGURE 7. The four passages of each sub-group are connected to a manifold 150 at the top, and this manifold is, in turn, connected to one outlet conduit 121 of a valve 94. The manifold 150 of one sub-group of each group connects to the left or binary zero-value outlet of a valve and the manifold of the other sub-group of the same group connects to the right or binary one-value outlet of the same valve. Thus, each valve 94 has four potential output paths for each of its two outlets.

The four paths for each control valve outlet lead to the equivalent cells in each of the four actuators served by the distributor. For example, the leftmost group of passages 148 in FIGURE 6 connect the zero and one outlets of the leftmost valve 94 to the $\bar{2}^0$ and $2^0$ cells in each of the four actuators. The next group of passages connect the outlets of the second valve 94 to the $\bar{2}^1$ and $2^1$ cells of each of the four actuators, and so on. The conduits at the bottom of the distributor are marked in FIGURE 6 to show the cells served thereby. For convenience, the four actuators are identified as 0, 1, 2 and 3 since, as will be described, the distributor 124 selects them in response to a two bit binary code input.

In order to selectively connect the outputs of the control valves 94 to the desired actuator, the tape sections 132 and 134 contain holes 152 positioned at predetermined points thereon which, when aligned with the passages 148, connect the valves to the appropriate cells. The holes in the upper tape section 132 are arranged so that when the tape is shifted to the left by deflection into the left cavity as shown, the two leftmost passages of each sub-group are opened and the other two are closed off. When the tape 132 is shifted to the right, the rightmost two passages of each sub-group are opened and the others are closed. The lower tape section 134 has its holes arranged so that when it is shifted left as shown, the first and third passages of each sub-group are opened and the second and fourth are closed. When this tape is shifted to the right, the second and fourth passages are opened and the first and third are closed. As shown in FIGURE 7, there are two transversely spaced groups of holes 152 in each tape, so both sub-groups of each group of passages are operated in the same manner.

From the foregoing, it will be appreciated that any selected actuator may be connected to the four control valves by appropriate movement of the tapes 132 and 134. In the position shown in FIGURE 6 the distributor connects the valves with actuator 0 by opening the leftmost passage in each sub-group; thus connecting both outlets of each valve 94 to the several cells of actuator 0. The positions necessary to connect any of actuators 1–3 can be determined by considering the lower tape 134 as representing the $2^0$ order in binary code and the upper tape as representing the $2^1$ order. Then consider that when a tape 132 or 134 is deflected into the left cavity, the value in the binary order represented by that tape is zero, and when the tape is deflected into the right cavity, the value is one. The actuator served for any given set of tape positions is the one whose identifying number is the decimal equivalent of the binary value represented by the tape positions.

The tapes of the distributor are deflected by a pair of binary control valves 154 and 156 similar in construction to valves 94. One output of control valve 154 is connected to the port adjacent left cavity 136 and the other to the port for cavity 138. The outlets for valve 156 are similarly connected to the ports adjacent cavities 140 and 142. Operation of valve 154 thus controls the positioning of tape 132 and operation of valve 156 controls tape 134. The two valves 154 and 156 are supplied with pressurized fluid from a suitable source, not shown.

The four control valves 94 of FIGURE 6, which operate to position the actuators to which they may be connected through the distributor are supplied with pressurized fluid through a common conduit 158. To avoid any possible difficulties during periods when the distributor is switching these valves 94 from one actuator to another, and to reduce the duty cycle of the valving system, a master control valve 160 is provided to control the fluid supply to valves 94. This master valve 160 is of the same general construction as the other binary valves with the exception that it has a spring 162 arranged to bias the stem therein in a direction to normally pressurize the left outlet port. This port is connected via conduit 164 to means (not shown) that clamp or detent each actuator in whatever position it occupies. Devices of this kind are known in the art and need not be described here. Only when the actuating solenoid 166 of valve 160 is energized to drive the stem to the left against the spring will the right hand outlet deliver pressure to the conduit 158 and valves 94. During this time, the clamping means is deactivated and the actuator selected by distributer 124 can be moved. Once the desired movement is achieved, the valve 160 may be de-energized and the clamp activated to hold the new incremental position.

It will be appreciated that the arrangement just described with reference to FIGURES 6 and 7 can be readily expanded to handle additional actuators by increasing the number of selecting tapes, and can handle actuators with larger numbers of cells by adding additional groups of passages and corresponding control valves 94.

While the invention has been particularly shown and described with reference to preferred embodiments thereof, it will be understood by those skilled in the art that various changes in form and details may be made therein without departing from the spirit and scope of the invention.

What is claimed is:

1. An incremental actuator for moving a load means comprising:

(a) a plurality of actuator cells arranged in a file which includes at least a foremost cell at the front of the file and a rearmost cell at the rear of the file;

(b) means for supporting the load means and each cell in the file except the rearmost cell for sliding movement axially of the file;

(c) each of said cells including:

(1) a housing having an elongated slot therein, (2) an actuating cavity formed in the housing adjacent said slot, (3) a tape section of flexible material movably received in the slot, said tape section having a first portion stationarily anchored to said housing and a second movable portion extending from said housing and a third portion between said first and second portions positioned in the slot adjacent said cavity, (4) tape actuating means for creating a pressure gradient extending transversely of said third portion of said tape section for deflecting the same into said actuating cavity and causing movement of said second portion of said tape section toward the housing;

(d) the second portion of the tape section of each cell in the file except the foremost cell being connected to the preceding cell in the file;

(e) means connecting the second portion of the tape section of the foremost cell to the load means; and (f) selective operating means for selectively operating the tape actuating means of the several cells to cause selected incremental movements of the load means.

2. The invention defined in claim 1 including means effective to limit the extent of movement of the movable second portion of each tape section with respect to its cell to a predetermined distance assigned to that cell.

3. The invention defined in claim 2 wherein the predetermined distance assigned to each cell is different for each cell.

4. The invention defined in claim 3 wherein the predetermined distances assigned to the cells in the file are units of distance equal to different powers of two units, and wherein the selective operating means is responsive to input signals in binary code.

5. The invention defined in claim 1 wherein said tape actuating means for each cell includes a port in said housing communicating with said slot adjacent said cavity on the opposite side of the third portion of said tape section from said cavity, and conduit means for conducting pressurized fluid to said port.

6. The invention defined in claim 5 wherein said selective operating means includes means for selectively applying pressurized fluid to the conduit means of the several cells.

7. The invention defined in claim 1 including guideway means to which the load means and the cells are affixed for rectilinear movement, the rearmost cell being stationarily secured to said guideway, and means operable to urge the load means in a direction to slide the movable cells of said file apart.

8. The invention defined in claim 7 wherein the means operable to urge the load means in a direction to slide the movable cells of said file apart include a second file of cells similar to said first named file and positioned at the opposite side of said load means from the first named file, said second file of cells including a cell corresponding to each cell of the first named file, and wherein the selective operating means includes means for operating the tape actuator means of the several cells in the second file in concert with the tape actuating means of the cells in the first named file.

9. The invention defined in claim 8 wherein the corresponding cells in the first and second files form pairs of cells, and wherein the selective operating means includes means associated with each pair of cells for operating the tape actuating means of that pair in the alternative so that only one of said pair of cells is activated at a time.

10. An incremental actuator for moving a load means comprising:

(a) support means, (b) guideway means mounted on said support means, said load means being slidably secured to said guideway means for rectilinear movement, (c) first and second files of actuator cells arranged on said guideway at opposite sides of said load means, each file including at least a foremost cell at the end of the file nearest the load means and a rearmost cell at the end of the file remote from the load means, each cell except the rearmost cell in each file being slidably mounted on said guideway means, the rearmost cell in each file being fixedly secured to the guideway means;

(d) each of said cells including:

(1) a housing having an elongated slot therein, (2) an actuating cavity formed in the housing adjacent said slot, (3) a tape section of flexible material movably received in the slot, said tape section having a first portion stationarily anchored to said housing and a second movable portion extending from said housing and a third portion between said first and second portions positioned in the slot adjacent said cavity, (4) tape actuating means for each cell including a port in the housing communicating with the slot adjacent the cavity on the opposite side of the third portion of said tape section from said cavity and conduit means for conducting pressurized fluid to said port, (e) the second portion of the tape section of each cell except the foremost cell in each of the first and second files being connected to the preceding cell in the same file;

(f) means connecting the second portion of the tape section of the foremost cell in each file to the load means;

(g) means effective to limit the extent of movement of the movable second portion of the tape section of each cell to a predetermined distance assigned to that cell, the predetermined distance assigned to each cell of the same file being equal to a different power of two units of movement, each cell in the first file having the same predetermined distance assigned to it as a corresponding cell in a second file whereby corresponding cells in the first and second files form pairs of cells;

(h) valve means associated with each pair of cells, said valve means operable in one position to direct pressurized fluid to the conduit means of one cell of the pair while depressurizing the conduit means of the other cell of the pair and operable in another position to direct pressurized fluid to the conduit means of the other cell in the pair while depressurizing the conduit means of said one cell; and (i) selective operating means for selectively operating the several valve means for the several pairs of cells in accordance with a binary code whereby to cause selected incremental movement of the load means.

11. The invention defined in claim 10 including at least a second incremental actuator having the elements and arrangements recited in clauses (a), (b), (c), (d), (e), (f) and (g) of said claim 10, and including a selectively operable distributor means connected between each valve means (h) and the corresponding pairs of cells in the several actuators and operable to selectively connect the said valve means to only the associated pair of cells in a predetermined one of said actuators at a time, whereby to share said valve means among the several actuators.

References Cited

UNITED STATES PATENTS 3,124,042 3/1964 Mahan ---------- 91—167 XR

OTHER REFERENCES

"Fluid Translator" by F. Voit, Jr., I.B.M. Technical Disclosure Bulletin, vol. 7, No. 11, April 1965

EDGAR W. GEOGHEGAN, *Primary Examiner.*

U.S. Cl. X.R.

91—167; 235—200